F. TIEMANN.
CONCENTRATION AND CRYSTALLIZATION APPARATUS ESPECIALLY FOR SUGAR MANUFACTURE.
APPLICATION FILED DEC. 7, 1911.
1,087,409.
Patented Feb. 17, 1914.
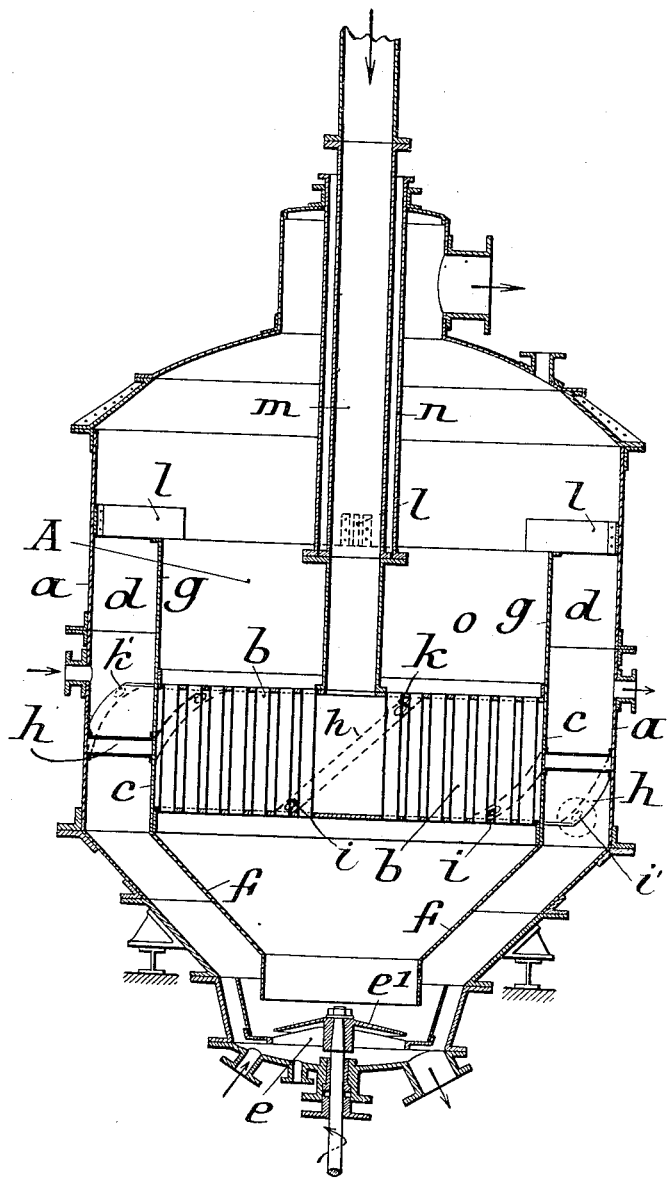

UNITED STATES PATENT OFFICE.

FRITZ TIEMANN, OF BERLIN, GERMANY.

CONCENTRATION AND CRYSTALLIZATION APPARATUS ESPECIALLY FOR SUGAR MANUFACTURE.

1,087,409.

Specification of Letters Patent. Patented Feb. 17, 1914.

Application filed December 7, 1911. Serial No. 664,371.

*To all whom it may concern:*

Be it known that I, FRITZ TIEMANN, a subject of the German Emperor, residing at 259 Kurfürstendamm, Berlin, W., Germany, have invented certain new and useful Improvements in Concentration and Crystallization Apparatus Especially for Sugar Manufacture; and I do hereby declare the following to be a full, clear, and exact description of the invention, such as will enable others skilled in the art to which it appertains to make and use the same.

This invention relates to concentration and crystallizing apparatus such as are used in sugar manufacture, and of the type in which the green sugar or material under treatment is caused to circulate by means of a centrifugal stirrer situated in the bottom of the apparatus.

The present invention has for its object to provide an improved apparatus of this type in which a reliable and uniform circulation of the material is effected.

The invention consists substantially in providing in such apparatus one or more inclined surfaces lying in the direction of the motion given the material by the centrifugal stirrer, along which surfaces the material is guided upward. According to the invention, also, above the inclined surfaces are arranged deflectors or baffles directed against the direction of motion of the material, which deflectors are adapted to throw the material striking against them and thereby cause it to drop, toward the space containing the heating device. The material flows through the heating apparatus downwardly in order to again reach the centrifugal stirrer after having absorbed the necessary heat for the evaporation. The inclined surfaces may be formed as a double envelop and be in communication with the heating device. They then serve simultaneously for the attachment of the heating device in place and for the removal therefore of the water of condensation and non-condensible gases. At the height to which the material is to rise in the apparatus are arranged deflectors against which the material comes in contact. Its further upward motion is thereby prevented and it is caused to fall back into the space containing the heating device. These deflectors may be arranged several above each other.

One form of construction of the apparatus is illustrated in sectional elevation in the drawing.

Within the vacuum apparatus A of the usual form and in the lower conical portion thereof is located a centrifugal stirrer $e$, for example of the type described in German Patent No. 202627, driven from below in any suitable manner. This stirrer possesses in the middle a baffle plate $e'$ which guides the material against the walls of the centrifugal drum. In the cylindrical part of the vessel A is arranged the heating device $b$, of which the envelop $c$ is extended toward the centrifugal stirrer by means of a conical wall $f$. To the top of the heating device is attached a cylinder $g$, which preferably rises to near the level to which the material is to rise in the apparatus, or to attain at the end of the boiling. In the annular space $d$ between the wall $a$ of the vessel and the walls $c$, $f$, $g$, are arranged the inclined rising surfaces $h$, which are preferably bent corresponding to the direction of motion which the material is given by the centrifugal stirrer. These surfaces $h$ may be of any desired length and may extend from the lower portion of the annular space $d$ to the top thereof; in the drawing, however, they are shown as extending substantially from the bottom to the top of the heating device $b$. As indicated in the drawings, these surfaces are formed of upper and lower plates secured to the inner face of the outer shell $a$ and the outer face of the inner shell $c$ and form hollow helical conduits which serve as additional heating means for the circulating sugar juices. To effect this object, each of the helical conduits $a$ is connected with the steam space of the heater $b$ by lower openings $i$ and upper openings $k$ through the wall $c$, on the one hand, and by lower openings $i'$ and upper openings $k'$ through the outer casing $a$. This admits of a circulation of the steam from the heater $b$ through the conduits, as well as the discharge of water of condensation and gaseous products from the apparatus. The condensed water flows from the heater $b$ through the lower openings $i$ into the conduits formed between the double walls $h$, through said conduits, thence through the lower opening $i'$ out of the casing $a$. The gases pass through the upper openings $k$ through the conduits and out of the upper openings $k'$, whence they may be conducted away from the apparatus by pipes or any other appropriate means. Above the wall $g$ straight or bent deflectors $l$ are mounted on the vacuum vessel, which deflectors operate against the direction of motion of the material. When there are several series of superposed deflectors the wall $g$ must have suitable openings at those places to conduct the deviated material inwardly.

The steam supply pipe $m$ leading to the heating device passes through the top of the vacuum apparatus and according to the drawing is centrally arranged, whereby a uniform distribution of steam in the heating device is obtained. This steam pipe is preferably provided with a jacket $n$ down to the level of the liquid.

Owing to the motion of the centrifugal stirrer the material flowing in the evaporator rises in a parabolic path to the walls and is guided upward into the channel $d$ wherein by means of the surfaces $h$ they continue moving in the same direction and toward the top of the vessel $a$. Owing to this rising movement of the material in a spiral path it finally encounters the deflectors $l$, which are so arranged that the green sugar striking against the same is caused to be thrown down toward the space containing the heating device. As the centrifugal stirrer is always causing fresh material to travel upward the material in the space $o$ moves through the tubes of the heating device downward toward the centrifugal stirrer which again drives it upward. This orderly and rapid movement of the material in all parts causes a uniform concentration of the solution in every part of the boiling device, so that the crystallizing out of the solution takes place under the most favorable conditions. By this means it is made possible to effect the crystallization by vaporizing the solution, thus using a temperature lower than the boiling temperature of the solution so that heating steam may be used of which the temperature is only slightly above the desired temperature at which the crystallizing out is to take place. In this manner partial supersaturation is avoided.

The new technical effect which the present invention provides over known apparatus, is the following: A positive and perfectly uniform motion of the material, in the direction determined by the inclined surfaces, takes place. Due to the inclined guiding surfaces the material which is forced upward by the centrifugal apparatus at the bottom, cannot drop back into the impelling space, to cause eddies and destroy the upward drive. The material moves along the guiding surfaces to the top of the apparatus in the direction given it by the centrifugal stirrer. The exchange of heat between the heating agent supplied to the heating device, and the material, is quite uniform. The material being continuously guided to the heating surfaces by the impelling forward of the material, the removal of water therefrom in all parts of the same proceeds with perfect regularity. A partial supersaturation is thus impossible. A particular effect consists in the fact that as has been found in actual working, the temperature of the heating agent relatively to the material can be kept lower than hitherto, whereby steam of lower pressure or other heating agents such as the hot liquids used in vacuum operations can be used, which would have no evaporating effect at all in known apparatus. By means of the apparatus crystallization can thus be effected by means of a sort of vaporization. Owing to the orderly motion the heat is supplied uniformly to all parts of the material and a corresponding removal of water takes place, therefore no partial superheating and no partial supersaturation can occur, so that when the present apparatus is used formation of fresh crystals is impossible. The sugar separated out by the evaporation or vaporizing thus takes place only on the crystals present, so that large and beautifully developed crystals are obtained with ease and certainty. Cane sugar as obtained by known apparatus has small crystals and is of poor appearance, still containing a large amount of syrup, whereas the sugar obtained by the present apparatus is in large, clear dry and beautifully developed crystals.

Having now particularly described and ascertained the nature of my said invention and in what manner the same is to be performed, I declare that what I claim is:—

1. An evaporator comprising an outer casing and an inner casing, means to cause the liquor to travel upwardly between said casings to a certain level where it is returned through the inner casing by gravity, and inclined surfaces between the casings to cause the liquor to pursue a spiral path.

2. An evaporator comprising an outer and an inner casing, heating means in said inner casing, means to cause the liquor to travel upwardly between said casings, means to impart a spiral motion to said liquor, and means interposed in the path of the rising liquor to deflect the same toward said heating means.

3. An evaporator comprising an outer casing, an inner casing forming therewith a passage in communication with the space in said inner casing at the top and bottom thereof, means to cause the liquor to travel upwardly in said passage, means to impart a spiral motion to said liquor, means interposed in the path of said rising liquor to deflect the same from said passage into the inner casing, and heating means in said inner casing through which the liquor is caused to pass by gravity.

4. The combination with a set of calandria tubes, of an open ended casing inclosing the same, an outer casing conforming in shape with said first named casing, centrifugal means to force the liquor upwardly between said casings, means to cause the upwardly moving liquor to pursue a spiral path, and deflector plates adapted to deflect the liquor from its path into the inner casing, through the calandria tubes and back to said centrifugal means.

5. An evaporator comprising an outer casing, an inner casing forming therewith a passage in communication with the space in said inner casing at the top and bottom thereof, heating means in said inner casing, means to cause the liquor to travel upwardly in said passage, and hollow deflector plates constituting auxiliary heating means in said passage to impart a spiral motion to said liquor.

6. An evaporator comprising an outer casing, an inner casing forming therewith a passage in communication with the space in said inner casing at the top and bottom thereof, heating means in said inner casing, means to cause the liquor to travel upwardly in said passage, and hollow deflector plates constituting auxiliary heating means in said passage and connected with said inner heating means and serving to impart a spiral motion to said liquor.

7. An evaporator comprising an outer casing, an inner casing, heating means in said inner casing, means to cause the liquor to travel upwardly between said casings, and auxiliary heating means located in the path of the rising liquor to impart a spiral motion thereto.

8. An evaporator comprising an outer casing, an inner casing, heating means in said inner casing, means to cause the liquor to travel upwardly between said casings, auxiliary heating means located in the path of the rising liquor to impart a spiral motion thereto, and means to finally deflect the liquor from its spiral path between the casings toward the heating means in said inner casing.

In testimony whereof I have affixed my signature, in presence of two witnesses.

FRITZ TIEMANN.

Witnesses:
 HENRY HASPER,
 WOLDEMAR HAUPT.